(12) United States Patent
Pappas

(10) Patent No.: US 8,448,604 B2
(45) Date of Patent: May 28, 2013

(54) FLOW CONTROL DEVICE

(75) Inventor: Nicholas J. Pappas, Sarasota, FL (US)

(73) Assignee: Medialore, LLC, Sarasota, FL (US)

(*) Notice: Subject to any disclaimer, the term of this patent is extended or adjusted under 35 U.S.C. 154(b) by 170 days.

(21) Appl. No.: 12/811,656

(22) PCT Filed: Jan. 5, 2009

(86) PCT No.: PCT/US2009/030091
§ 371 (c)(1),
(2), (4) Date: Jul. 2, 2010

(87) PCT Pub. No.: WO2009/089141
PCT Pub. Date: Jul. 16, 2009

(65) Prior Publication Data
US 2010/0282174 A1 Nov. 11, 2010

Related U.S. Application Data

(63) Continuation of application No. 11/970,300, filed on Jan. 7, 2008, now abandoned.

(51) Int. Cl.
*A01K 7/06* (2006.01)
*B65D 41/04* (2006.01)

(52) U.S. Cl.
USPC ............ 119/72.5; 401/213; 215/337

(58) Field of Classification Search
USPC . 119/72.5, 72; 222/631, 212, 153.1; 401/209, 401/213, 202, 205, 206, 208; 215/337, 339, 215/340
See application file for complete search history.

(56) References Cited

U.S. PATENT DOCUMENTS

| | | | |
|---|---|---|---|
| 1,714,030 A | 5/1929 | Le Boeuf |
| 2,275,051 A | 3/1942 | Maloney |
| 2,307,220 A | 1/1943 | Hewitt |
| 2,646,776 A | 7/1953 | Walter |
| 2,705,955 A | 4/1955 | Nesset et al. |
| 2,726,636 A | 12/1955 | Frederiksen |
| 2,789,717 A | 4/1957 | Demke |
| 3,179,300 A | 4/1965 | Davidson et al. |
| 3,451,651 A | 6/1969 | Rood |
| 3,529,575 A | 9/1970 | Schalk |
| 3,566,844 A | 3/1971 | Occhiodori et al. |
| 3,589,338 A | 6/1971 | Lovitz |
| 3,752,124 A | 8/1973 | Gabriel |

(Continued)

FOREIGN PATENT DOCUMENTS
FR 755153 11/1933
GB 2215673 9/1989

OTHER PUBLICATIONS

PCT International Search Report dated Sep. 24, 2003.
PCT International Search Report dated May 22, 2009.

(Continued)

*Primary Examiner* — Yvonne Abbott
(74) *Attorney, Agent, or Firm* — McCarter & English, LLP

(57) ABSTRACT

A flow control device is provided for regulating the flow of fluid from a container. An exemplary control mechanism includes an inner cap member, an overcap member, and a ball captured therebetween. The overcap member is adapted for axial translation relative to the inner cap member, thereby facilitating one-handed manipulation. Adapters may be provided to facilitate mounting of the disclosed flow control device relative to containers of differing geometry. A releasable locking mechanism may be provided to prevent the flow control device from becoming inadvertently operational.

7 Claims, 12 Drawing Sheets

U.S. PATENT DOCUMENTS

| Patent | Date | Inventor |
|---|---|---|
| 3,771,496 A | 11/1973 | Atchley |
| 3,794,202 A | 2/1974 | Unger |
| 3,838,664 A | 10/1974 | Atchley |
| 4,050,826 A | 9/1977 | Berghahn et al. |
| 4,111,567 A | 9/1978 | Berghahn et al. |
| 4,132,225 A | 1/1979 | Whattam |
| 4,368,184 A | 1/1983 | Drucker |
| 4,382,520 A | 5/1983 | Alefff |
| 4,458,817 A | 7/1984 | Guala |
| 4,637,345 A | 1/1987 | Hostetler |
| 4,694,969 A | 9/1987 | Granat |
| 4,787,337 A | 11/1988 | Mayer |
| 4,940,350 A | 7/1990 | Kim |
| 4,991,733 A | 2/1991 | Marino |
| 5,073,057 A | 12/1991 | Lathrop et al. |
| 5,301,634 A | 4/1994 | Ho |
| 5,301,635 A | 4/1994 | Rovira Badia et al. |
| 5,327,853 A | 7/1994 | Hostetler |
| 5,363,802 A | 11/1994 | Huff |
| 5,402,750 A * | 4/1995 | Katz ............ 119/72.5 |
| 5,447,118 A | 9/1995 | Huff et al. |
| 5,653,353 A | 8/1997 | Otto et al. |
| 5,669,329 A | 9/1997 | Krause |
| 5,685,445 A | 11/1997 | Dobbs |
| 5,743,437 A | 4/1998 | Moore et al. |
| 5,816,194 A | 10/1998 | Huff |
| 5,901,882 A | 5/1999 | Siegel |
| 6,123,340 A | 9/2000 | Sprafka et al. |
| 6,230,937 B1 | 5/2001 | Johnson et al. |
| 6,237,800 B1 | 5/2001 | Barrett |
| 6,293,226 B1 | 9/2001 | Hwang |
| 6,325,253 B1 * | 12/2001 | Robinson ............ 222/212 |
| 6,450,352 B1 | 9/2002 | Dejonge |
| 6,553,937 B1 | 4/2003 | Cheng |
| 6,619,492 B2 | 9/2003 | Battegazzore |
| 6,718,912 B2 | 4/2004 | Pappas |
| 6,729,488 B2 | 5/2004 | McNary |
| 6,758,165 B2 | 7/2004 | Pappas |
| 6,896,151 B1 | 5/2005 | Robinson |
| 6,957,626 B2 | 10/2005 | Ela et al. |
| 6,986,322 B2 | 1/2006 | Lumpkin et al. |
| 7,044,085 B2 | 5/2006 | Arnold |
| 7,117,818 B2 | 10/2006 | Pappas |
| 7,204,201 B2 | 4/2007 | Leombruno |
| 7,610,875 B2 | 11/2009 | Webber |
| 7,654,225 B2 | 2/2010 | Madsen et al. |
| 2003/0079692 A1 * | 5/2003 | Steudler et al. ............ 119/72.5 |
| 2005/0086830 A1 | 4/2005 | Zukor et al. |

OTHER PUBLICATIONS

Office Action dated Mar. 4, 2010 from U.S. Appl. No. 11/970,300.
Notice of Abandonment dated Oct. 5, 2010 from U.S. Appl. No. 11/970,300.
International Search Report PCT/US03/18856.
PCT International Search Report and Written Opinion dated Oct. 22, 2009.

* cited by examiner

FLOW CONTROL DEVICE

1. CROSS REFERENCE TO RELATED APPLICATIONS

Reference is made to previously filed U.S. patent applications, as follows: (i) an application entitled "Multipurpose Flow Control Device", that was filed on Oct. 10, 2006, and assigned Ser. No. 10/798,985, now U.S. Pat. No. 7,117,818; (ii) an application entitled "Multipurpose Flow Control Device," that was filed on Jun. 16, 2003, and assigned Ser. No. 10/462,442, now U.S. Pat. No. 6,758,165; and (iii) an application entitled "Pet Drinking Aid Device," that was filed on Jun. 24, 2002, and assigned Ser. No. 10/178,606, now U.S. Pat. No. 6,718,912.

2. TECHNICAL FIELD

The present disclosure relates to devices for use with a container or vessel containing a fluid and, more particularly, to devices for use with a bottle to assist in dispensing such fluid in a controlled manner, e.g., to assist an animal in drinking therefrom. The present disclosure further relates to container(s) and/or vessel(s) that include an advantageous flow regulation device.

3. BACKGROUND OF THE DISCLOSURE

Fluids are routinely contained within containers and/or vessels, e.g., plastic and/or glass bottles. To gain access to the fluids contained with a container/vessel, a cap is generally removed and the fluid is poured or otherwise dispensed therefrom. Thus, for example, in the case of plastic beverage bottles, a cap is generally screw threaded onto the throat of the bottle which can be removed, as desired, when it is desired to access the contents thereof. The beverage is generally consumed directly from the bottle, by way of a straw, or by pouring the beverage into a cup or glass.

In certain circumstances, beverage/water bottles may be provided with a control mechanism that permits fluid to flow therefrom upon axial movement of an annular flange relative to a fixed central abutment member. By moving the annular flange away from the bottle, an annular fluid flow path around the central abutment member is created. Axial movement of the annular flange is generally limited by a stop mechanism, thereby ensuring that the annular flange does not become separated from the bottle/control mechanism. Once the control mechanism is in the "open" position, fluid may be dispensed from the bottle under the action of gravity by tilting or inverting the bottle in combination with squeezing and/or suction forces. Return movement of the annular flange toward the bottle may be undertaken to "close" the bottle, i.e., prevent further fluid flow therefrom.

The foregoing bottle designs are generally effective for human consumption of fluids. However, such designs are not effective for a host of other applications. Thus, for example, pet owners involved in providing their pets with recreation encounter a variety of issues. For example, dog owners encounter issues associated with satisfying a dog's thirst when dog and owner are away from the dog's water bowl, e.g., when on a walk or engaged in athletic/recreational activities. It is often inconvenient and/or impractical when not at home to bring along and set up a bowl or some other container from which a pet can drink. While naturally occurring sources of fluid refreshment are sometimes available, e.g., ponds, puddles and the like, more frequently pet owners are left to their own ingenuity in attempting to address their dog's thirst when remote from the home-based water bowl.

Efforts have been devoted in the prior art to developing devices and/or systems for providing fluid refreshment to pets. For example, significant efforts have been expended in providing fluid dispensers for caged pets, such as rabbits, guinea pigs, hamsters and the like. U.S. Pat. No. 3,529,575 to Schalk et al., U.S. Pat. No. 3,771,496 to Atchley, and U.S. Pat. No. 5,363,802 to Huff disclose drinking bottles that may be detachably mounted to a pet's cage. The fluids from the disclosed drinking bottles are introduced into the cage by way of an angled tube that fits through openings defined in the wire cage. Control and/or regulation of fluid flow into the cage is provided by a displaceable ball (Atchley '496 patent and Huff '802 patent), a valve assembly (Schalk '575 patent), or multiple balls operating in conjunction to establish a seal.

Prior art efforts have also been devoted to developing systems for use by larger pets, e.g., dogs. For example, U.S. Pat. No. 5,301,634 to Ho discloses an animal feeder designed for convenient mounting to a horizontal wire member, the feeder including a ball 60 disposed in a tubular extension 43.

A pet drinking device offering portability to pet owners is disclosed in U.S. Pat. No. 6,293,226 to Hwang. The device of the Hwang '226 patent includes a bottle having a threaded mouth and a cover that engages the threaded mouth. An unsecured gasket is positioned between the cover and the bottle. The cover includes a main body that is internally threaded to engage the mouth of the bottle, and a tube. The tube defines an outwardly threaded portion at an end thereof. An internally threaded sleeve is mounted to the outwardly threaded portion of the tube. An unsecured sealing ring is positioned between the tube and the sleeve. A ball and washer are positioned within the sleeve and a lid is tethered to the cover. A belt is also provided for mounting the Hwang drinking device to a stationary structure, e.g., a hook on a wall.

The present applicant has also obtained patent protection with respect to advantageous flow control devices. See, U.S. Pat. No. 7,117,818; U.S. Pat. No. 6,758,165; and U.S. Pat. No. 6,718,912. The entire contents of these patents have been incorporated by reference herein.

Despite the efforts referenced hereinabove, a need remains for advantageous control mechanisms for regulating the flow of fluid from a container or vessel that facilitates user control, e.g., between a closed and an open orientation.

4. SUMMARY OF THE DISCLOSURE

The present disclosure is directed to control mechanisms for regulating the flow of fluid from a container or vessel, e.g., a plastic bottle containing a fluid such as water or the like. The disclosed control mechanisms may be advantageously employed in a variety of applications where it is desired to dispense and/or access fluids in a controlled manner, e.g., applications wherein a liquid, colloidal system, suspension or the like is to be dispensed/accessed in a controlled manner. The disclosed control mechanisms may be provided as an accessory item, i.e., an item that is adapted to be secured to a container/vessel/bottle. The disclosed control mechanisms may also be pre-mounted to a container/vessel/bottle, e.g., in the manufacturing process. In such circumstance, the present disclosure is directed to the container/vessel/bottle in combination with such advantageous control mechanism. Still further, the disclosed control mechanisms may be advantageously employed with other fluid delivery systems, e.g., a fluid delivery system/apparatus that is constructed/designed in a manner analogous to an I.V. fluid delivery system (e.g., gravity and/or pump-fed), a fluid delivery stalk or tube, or the like.

In an exemplary embodiment, the present disclosure relates to an animal or pet drinking aid that provides animals/ pets with convenient and controlled access to fluid refreshment, e.g., when away from a home-based water bowl. The disclosed drinking aid overcomes difficulties associated with typical water bottles that deliver uncontrolled fluid flow when fully or partially inverted. The uncontrolled fluid flow provided by such conventional water bottles often finds its way into a pet's windpipe or onto the ground, regardless of the effort and care expended in attempting to address the pet's thirst. In exemplary embodiments, the disclosed drinking aid also facilitates operational use, e.g., providing effective control functionality for movement between a "closed" orientation and an "open" orientation (including varying levels of flow therethrough), and vice versa.

The disclosed pet drinking aid may include a cap that is adapted to be detachably mounted to a fluid-containing bottle. The cap may be advantageously threaded onto a fluid-containing bottle. Alternatively, the disclosed cap may include an elastomeric sleeve that facilitates detachably mounting the cap to a bottle, thereby obviating the need for cooperative threads as between the cap and the bottle. In a first exemplary embodiment, the disclosed cap includes an internal ball that advantageously restricts and/or moderates the flow of fluid from a bottle when positioned at various angles of inversion. The internal ball is typically restrained or captured within the cap by a circumferential flange or rim. An elastomeric, e.g., rubber, washer may be positioned adjacent and/or in engagement therewith. The washer (when present) provides an enhanced fluid seal when a pet (or other user) is not accessing fluid contained within the container. Thus, for example, the bottle may generally be inverted without fluid leakage due to sealing interaction between the ball and the elastomeric washer, and between the washer and the rim of the cap.

In an alternative exemplary embodiment, the disclosed cap includes an elongated member and/or hemispheric member that is adapted for substantially axial/reciprocal motion relative to a housing, thereby providing a fluid flow opening for fluid flow from an associated container/vessel to a product user, e.g., a pet. The elongated member may advantageously define a substantially hemispheric or conical end geometry against which a user's tongue may apply a displacement force. Alternatively, a hemispheric structure may be employed within the disclosed housing to control/facilitate fluid flow therethrough. For purposes of the present disclosure, the term "elongated member" expressly encompasses an hemispheric member that controls/facilitates fluid flow in the manner described herein.

Axial displacement may be opposed by a biasing member, e.g., a spring, positioned within the housing/cap structure, and overall displacement/travel of the elongated member may be limited by one or more travel limiting structures, e.g., internal rims/ridges defined within the housing/cap structure. To facilitate desired levels of flow, the elongated member may define one or more flow channels that permit increased flow levels therethrough and/or therearound. Thus, for example, one or more flow channels/openings may be defined in the elongated member and/or one or more flow openings may be defined in an abutment rim/ridge that may optionally provide sealing functionality to the elongated member.

In exemplary embodiments that include an elongated member to control/regulate fluid flow, a relative tightening of structural components associated with the cap structure may be effective to prevent axial translation/movement of the elongated member relative to the housing/cap structure, thereby preventing fluid flow therearound and/or therethrough. For example, by moving a first structural member away from a second structural member, the elongated member may be freed up for axial motion within cap structure, thereby permitting fluid flow from an associated vessel/container/bottle/stalk/tube and through an opening defined in the cap structure. Conversely, movement of a first structural member toward a second structural member may function to "pinch" or fixedly capture the elongated member so as to substantially prevent axial motion of the elongated member and thereby forestall fluid flow through the disclosed cap structure. Further, an overcap may be provided to effect and/or enhance sealing. Additional structural aspects and/or options associated with "elongated member" embodiments of the present disclosure will be described with reference to the appended figures and exemplary implementations thereof herein below.

Of note, the disclosed sealing function may be also be achieved through a two-shot molding process, whereby a sealing material (e.g., a rubber or other elastic material) and a conventional polymeric material (e.g., polypropylene) are injected into a suitably configured mold. Such two-shot molding technique is effective to impart sealing and/or leakage-reduction properties to the region adjacent the internal ball and/or elongated member captured adjacent thereto.

In an exemplary embodiment, a flow control mechanism is disclosed for use with a vessel/container/bottle and includes a lower cap member, overcap member and a ball that is captured therebetween. The lower cap member is adapted to be mounted to a vessel, container or bottle, e.g., by screw threading, a flexible sleeve or the like. The overcap member is adapted to be movably mounted relative to the lower cap. The ball typically rests on an internal flange or shelf formed in the lower cap member and, depending on the relative location of the overcap member, either prevents fluid from flowing through the control mechanism or permits fluid to flow therearound in a regulated fashion.

More particularly, in an exemplary embodiment of the disclosed control mechanism, the overcap member may be "tightened" such that the ball is prevented from movement relative to the lower cap/overcap members, thereby preventing fluid flow therearound. By moving the overcap member away from the lower cap member, the ball is freed up for rotational and axial (and limited lateral) motion within the space defined between the lower cap/overcap members, thereby permitting fluid flow from the vessel/container/bottle and through an opening defined in the overcap member.

Exemplary flow control mechanisms/devices according to the present disclosure are defined by an overcap and an inner cap member which together define an internal flow passage. The flow control mechanism/device is adapted to be mounted with respect to bottle/vessel, either directly or indirectly, e.g., by way of an adapter. The flow control mechanism/device may be detachably mounted with respect to the bottle/vessel or fixedly mounted with respect thereto. Thus, flow control mechanisms/devices according to the present disclosure may function as accessory devices for selective engagement with a bottle/vessel or may be integrally and/or fixedly mounted with respect to such bottle/vessel, e.g., at the time of fabrication.

A ball may be captured between the overcap and the inner cap members to facilitate and control flow therethrough. The overcap is repositionable relative to the inner cap such that at least two relative positions may be defined. However, in exemplary embodiments of the present disclosure, more than two relative positions may be defined between the overcap and the inner cap members, such that fluid flow through the flow control mechanism/device is prevented in a first position (i.e., a "closed" configuration), and is permitted in a second position (i.e., an "open" configuration). Exemplary embodiments of the present disclosure permit the overcap and inner cap members to define a plurality of "open" configurations, such that varying levels of fluid flow are permitted through the flow control mechanism/device.

According to exemplary embodiments of the present disclosure, the overcap may include a sidewall that is positioned at least in part radially outward of the side wall of the inner cap member. The overcap may be adapted for axial translation relative to the inner cap member such that, in a first position ("closed" configuration), the ball captured between the overcap and inner cap member substantially (or completely) obstructs the flow passage through the overcap and/or inner cap member, thereby preventing fluid flow. The axial translation between the overcap and the inner cap member further permits the overcap to assume one or more additional relative positions (each an "open" configuration), such that fluid flow is permitted around the ball captured therebetween. Axial translation of the overcap member relative to the inner cap member is generally limited by at least one stop mechanism defined therebetween.

In exemplary embodiments of the disclosed flow control mechanisms/devices, the inner cap member may define one or more annular ridges that extend radially outward. The annular ridge(s) are adapted to interact with an inwardly directed annular projection formed on and/or defined by the overcap member, such that axial translation of the overcap member relative to the inner cap member requires the inwardly directed annular projection of the overcap member to "snap" past or otherwise override the outwardly directed annular ridge(s) formed on and/or defined by the inner cap member into the intermediate valley region(s) therebetween. Of note, in implementations where the inner cap member includes/defines a plurality of outwardly directed annular ridges, such plurality of annular ridges may be equally spaced along the axis of the inner cap member or unequally spaced relative thereto. The overcap member may also define a plurality of axially spaced, inwardly directed annular projections. Such plurality of inwardly directed annular projections are adapted to interact with the annular ridges and intermediate valley region formed on the inner cap member, thereby providing greater sealing, security and/or stability of the overcap member as it assumes various positions relative to the inner cap member.

Structural interaction between the inwardly directed annular projection(s) of the overcap member and the annular ridge(s)/valley regions of the inner cap member further function to enhance the sealing functionality therebetween. The disclosed sealing function may be also be achieved through a two-shot molding process, whereby a sealing material (e.g., a rubber or other elastic material) and a conventional polymeric material (e.g., polypropylene) are injected into a suitably configured mold. Such two-shot molding technique is effective to impart sealing and/or leakage-reduction properties to either or all of the inwardly directed annular projections of the overcap and the annular ridges and intermediate valley region(s) of the inner cap. The sealing functionality associated with the overcap/inner cap member interaction described herein is generally more effective as compared to threading interaction, wherein leakage may occur based on fluid travel along the threads, e.g., when the vessel/container is squeezed, partially inverted and/or in transition from a non-inverted to an inverted orientation.

The disclosed flow control mechanism/device may also define a locking mechanism that permits the overcap member to be "locked" relative to the inner cap member, e.g., in a "closed" configuration. In an exemplary embodiment, the locking mechanism may include a plurality of downwardly extending legs that extend from the overcap member. The downwardly extending legs advantageously define engagement tabs/flanges that are adapted to fit within corresponding openings defined in the base element associated with the inner cap member. The tabs may be released by squeezing at appropriate points around the overcap to allow overcap to be moved and/or the locking effect may be overcome by exerting extra pulling force, thereby deflecting the tabs for release from engagement with the openings. Of note, the legs/tabs may be associated with, and extend upwardly from, the base element. In such alternative embodiment, openings/slots may be formed at or near the lower face of the overcap to releasably receive such upwardly extending legs/tabs, thereby reversing the structural arrangement but maintaining the optional locking functionality described herein.

In a further alternative embodiment, the overcap member may be rotated relative to the inner cap member to place the tabs/flanges in an obstructed/interference position relative to the base element of the inner cap member. Rotation of the overcap member in the opposite direction may bring the tabs/flanges into alignment with the openings defined in the base element of the inner cap member, thereby permitting axial translation of the overcap relative to the inner cap, i.e., "unlocking" of the flow control mechanism/device. Such rotational locking and unlocking of the disclosed legs/tabs is effective whether the legs/tabs extend downwardly from the overcap or upwardly from the base element (for interaction with corresponding openings defined on the opposite structure).

In a further optional locking design according to the present disclosure, tabs may be mounted and/or molded with respect to the base element of the inner cap member or in conjunction with an annular ridge defined on the inner cap member, such tabs being oriented in a radially outward manner such that the tabs are adapted to releasably engage the overcap member. Such engagement may involve the tabs engaging (i) opening(s) formed in the overcap member, (ii) an annular depression formed in the overcap member, and/or (iii) the annular projections defined by the overcap member. In exemplary embodiments, it is contemplated that the tabs could be released by squeezing the overcap member at radially offset positions relative to the tab locations. Thus, in an exemplary implementation, two tabs that are spaced by approximately 180° may be provided on the inner cap member and release thereof may be achieved by pressing inward on the overcap member at two opposed locations that are each offset by approximately 90° from respective tab locations. In this way, the overcap member is caused to flex inward at the points of compression, and an associated outward deflection is effected in the areas interacting with the tabs, thereby freeing such tabs from the corresponding openings/slots/depression formed in the outer cap member. Alternatively, the engagement may be overcome by applying adequate force to the overcap member.

The disclosed flow control mechanism/device may include various additional features, structures and/or functions. For example, the overcap member may define an outwardly directed structure to facilitate user interaction therewith. Thus, in an exemplary embodiment, an outwardly extending rim may be defined at or near a distal end thereof to facilitate a user's grasp thereof to effect axial translation relative to the inner cap member. In addition, the disclosed flow control mechanism may be adapted to interact and function with a stalk or tube to facilitate fluid delivery, e.g., to facilitate hydration of an elderly patient, injured animal or the like.

The disclosed flow control mechanism/device offers substantial user-related benefits. For example, the ability to open/close the flow control mechanism/device through axial translation of an overcap member relative to an inner cap member facilitates single-hand actuation. In addition, interaction between the ridge(s) and intermediate valley(s) of the inner cap member and the projection(s) of the overcap enhances sealing when compared to existing threaded applications and permits a user to position the flow control mechanism/device for a desirable level of fluid flow. Optional inclusion of a locking mechanism, as described herein, ensures that the flow control mechanism/device provides secure closure prior to and/or in between uses thereof. Still further, the optional inclusion of adapter(s) permits the disclosed flow control mechanism/device to be used with and detachably connected to vessels/containers having differing neck designs/geometries. Indicia may be provided on the flow control mechanism, e.g., on the inner cap member, to communicate the degree to which the flow control mechanism/device is "open" based on the extent of axial translation of the overcap member relative to the inner cap member.

Flow control mechanisms according to the present disclosure are relatively inexpensive to fabricate and provide an efficient, safe and reliable way to dispense fluids from a container/vessel/bottle and/or provide animals/pets with fluids from a bottle, particularly in instances and places where a bowl or other container is simply not a feasible or convenient choice. Thus, according to the present disclosure, a flow control mechanism and an animal/pet drinking aid are provided that allow users to avoid undesirable situations where the pet may gag or choke on fluids supplied from a typical water bottle. The disclosed flow control mechanism and animal/pet drinking aid advantageously overcome the potential for waste and spillage generally associated with fluids provided from containers/vessels/bottles, e.g., fluids provided to pets in portable water bowls and the like.

Additional features, benefits and functionalities associated with control mechanisms and animal/pet drinking aids according to the present disclosure will be apparent from the detailed description which follows.

5. BRIEF DESCRIPTION OF THE FIGURES

The features, benefits and functionalities of the present disclosure will become more readily apparent to those skilled in the art from the following detailed description of preferred embodiment(s) when considered together with the accompanying drawings, wherein.

6. DETAILED DESCRIPTION OF EXEMPLARY EMBODIMENT(S)

Figures 1, 1A:
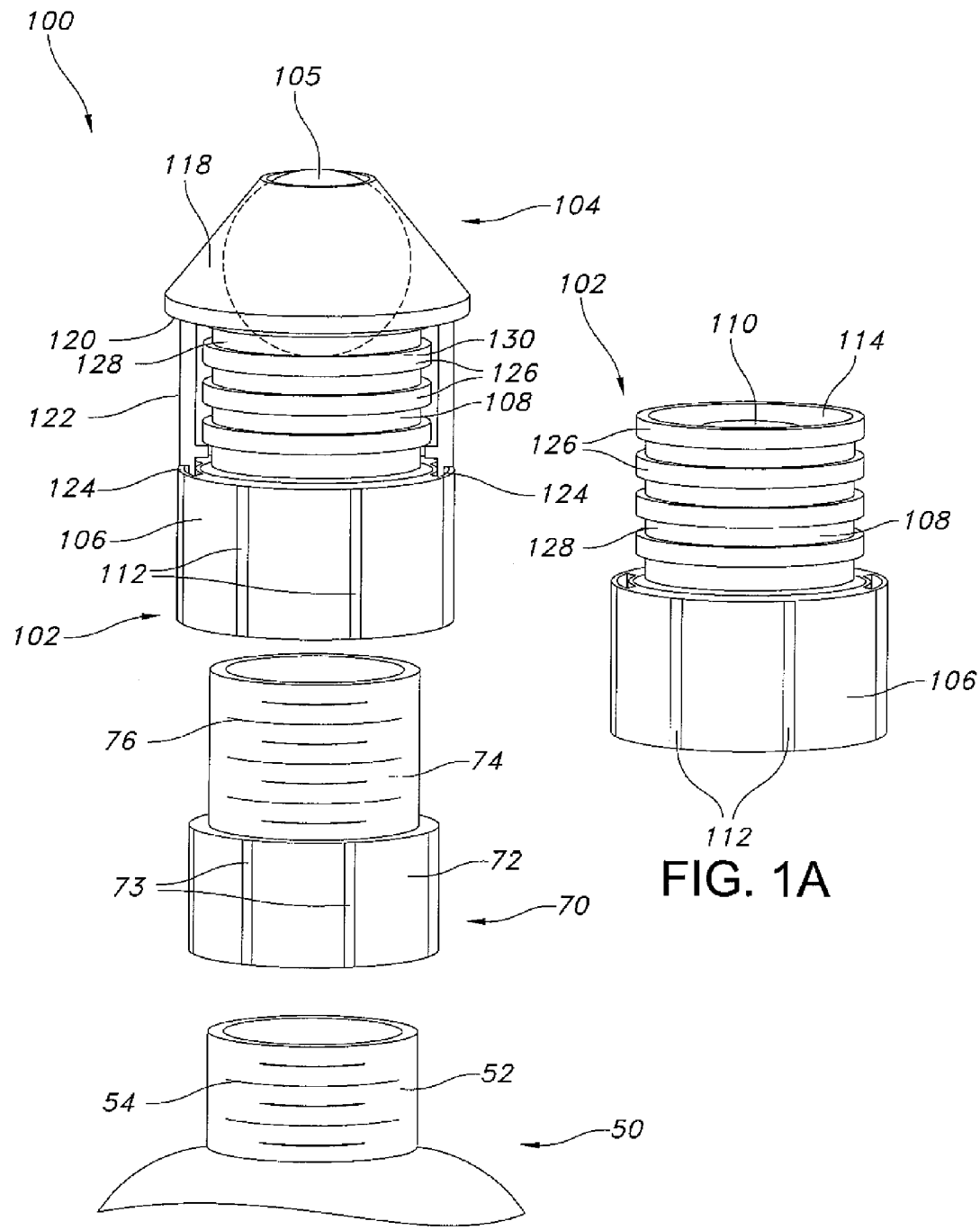
FIG. 1 is an exploded view of an exemplary embodiment of a flow control device, adapter and a top portion of a bottle/vessel, according to the present disclosure.
FIG. 1A is a perspective view of a component associated with the exemplary flow control device of FIG. 1.

The flow control mechanisms/devices of the present disclosure advantageously regulate fluid flow from a container, vessel, bottle or the like. The flow control mechanism/device may be provided as a free standing item, e.g., an accessory unit/assembly for independent purchase and use, or as part of an integrated product offering, e.g., permanently or detachably secured to a container, vessel or bottle. The disclosed flow control mechanisms/devices may be employed in a variety of applications, e.g., to moderate and/or regulate flow of liquids, colloidal systems, suspensions and the like. For example, flow control mechanisms/devices according to the present disclosure may be employed in systems wherein the fluid is to be consumed and in systems wherein the fluid is to be applied to a surface or substrate, e.g., deodorants/antiperspirants, fluid application systems such as wetting devices for mailing applications, colorant dispensers, inking mechanisms and the like. Thus, the disclosed flow control mechanisms/devices may be employed in any application where it is desired to regulate the flow of a fluid's egress from a container, vessel, bottle or the like.

In an exemplary application of the present disclosure, the flow control mechanisms/devices may be employed in connection with an animal or pet drinking aid. The animal/pet drinking aids of the present disclosure provide pets, e.g., dogs, cats, ferrets, rodents and the like, with convenient and controlled access to fluid refreshment, e.g., when away from a home-based water bowl. As discussed in greater detail below, the disclosed animal/pet drinking aids overcome difficulties associated with typical water bottles that deliver uncontrolled fluid flow when fully or partially inverted. The uncontrolled fluid flow provided by such conventional water bottles often finds its way into a pet's windpipe or onto the ground, regardless of the effort and care expended in attempting to address the pet's thirst. The disclosed animal/pet drinking aids are advantageously sized and dimensioned to be utilized with any standard size fluid bottle, as are known in the art. Adjustments to the size and/or dimensions of the disclosed animal/pet drinking aids may be made to facilitate use with non-conventionally sized fluid bottles, as is apparent from the detailed description provided herein. In addition, mounting adapters may be provided to facilitate mounting of the disclosed flow control mechanism/device to bottles/vessels having differing neck geometries and/or structural characteristics.

Although the exemplary flow control mechanisms/devices disclosed herein may be referred to and/or disclosed with reference to use as pet drinking aids, it is to be understood that such devices/structures may be employed in a variety of applications, e.g., in systems wherein a fluid is to be consumed and/or in systems wherein a fluid is to be applied to a surface or substrate, as noted above. Accordingly, the exemplary pet drinking aids described hereinafter are illustrative of flow control mechanisms/devices having a host of advantageous applications, including without limitation, as pet drinking aids.

Figure 2:
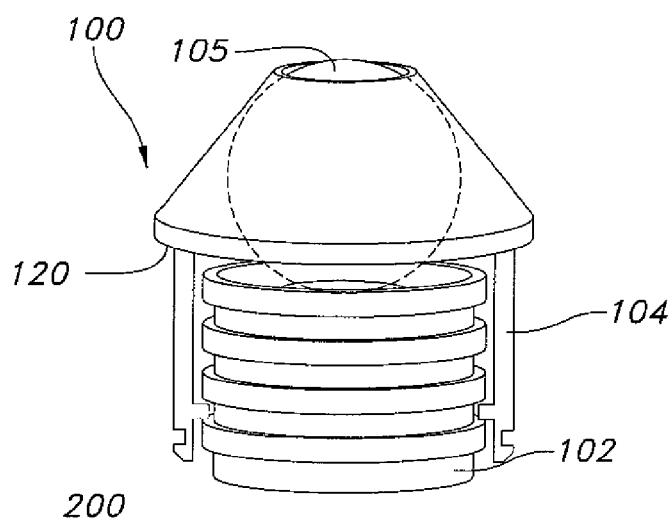
FIG. 2 is a side view of a flow control device according to the present disclosure.

With reference to FIGS. 1, 1A and 2, an exemplary flow control device 100 according to the present disclosure is schematically depicted for use in conjunction with a conventional bottle 50. Flow control device 100 may be used, inter alia, as a pet drinking aid. The bottle 50 includes a neck 52 that defines outwardly threaded portion 54. Circumferential ridge(s) may be defined on the outside of neck 52, as is conventional, to provide tamper resistance to bottle 50 through interaction with a conventional cap (not shown), as is known in the art.

In exemplary embodiments of the present disclosure, an optional adapter 70 is provided for use in facilitating the overall assembly of flow control device 100 relative to bottle 50. Adapter 70 typically defines an internal flow passage, e.g., a substantially cylindrical flow passage, and is advantageously adapted to facilitate mounting of flow control device 100 to bottle(s)/vessel(s) 50 of one or more neck sizes and/or geometries. For example, fluid-containing bottles/vessels may feature different thread configurations and/or pitches, and/or different outer diameters. Individual adapters 70 may be provided according to the present disclosure, each adapter including a female attachment region 72 and a male attachment region 74. The female attachment region 72 may include internal thread(s) (not pictured) to facilitate engagement with the outwardly threaded portion 54 of bottle/vessel 50. Alternatively, female attachment region 72 may take the form of an elastic engagement portion that is adapted to resiliently engage outwardly threaded portion 54 of bottle/vessel 50 (or an unthreaded neck region of a bottle/vessel), i.e., in a non-threaded manner. Male attachment region 74 generally defines an outwardly threaded portion 76 that is adapted to threadingly engage flow control device 100.

With reference to flow control device 100, the overall assembly generally includes two (3) distinct components: inner cap member 102, overcap member 104 and ball 105. With further reference to FIGS. 1 and 1A, inner cap member 102 includes a base element 106 and an upwardly extending cylindrical region 108. A flow passage 110 is defined through inner cap member 102. Although not pictured, base element 106 typically includes inwardly directed thread(s) for engagement with adapter 70 and/or threaded portion 54 of bottle 50. Alternatively, base element 106 may be associated with an elastomeric sleeve or similar structure to facilitate mounting with respect to bottle 50.

Exemplary base element 106 also includes vertically oriented knurls 112 to facilitate use thereof, e.g., rotational movement of base element 106 (and inner cap member 102 as a whole) relative to bottle 50. Knurls 73 may also be provided on adapter 70 to facilitate such rotational motion. Alternative features and/or structures may be provided to facilitate user interaction with such element(s), e.g., texturized surfaces, beads, bumps, chevrons and the like. In addition, such features and/or structures may be omitted entirely without departing from the spirit or scope of the present disclosure.

With particular reference to FIG. 1A, cylindrical region 108 of inner cap member 102 generally defines a substantially conical basin 114 for cooperation with and/or receipt of ball 105. The geometric details of basin 114 may be selected to best interact with ball 105. Thus, for example, basin 114 may define an internal radius of curvature that substantially corresponds with the radius of ball 105, thereby facilitating effective nesting/capture of ball 105 relative to inner cap member 102 when flow control device 100 is fully assembled.

With reference to FIG. 1, exemplary overcap member 104 includes a conical upper region 118, annular rim projection 120, and downwardly extending side wall 122. Rim projection 120 advantageously facilitates interaction with overcap member 104 to effect axial translation thereof relative to inner cap member 102. The outer surface of upper region 118 is generally configured and dimensioned to accommodate flow interaction therewith, e.g., licking motion by a pet seeking to engage ball 105 so as to cause fluid flow therearound. The inner surface of conical upper region 118 is advantageously configured and dimensioned to interact with and capture ball 105. Thus, for example, the inner surface of upper region 118 may define a substantially curved surface characterized by a radius of curvature that substantially corresponds to the radius of ball 105. Accordingly, the inner surface of upper region 118 and basin 114 of inner cap member 102 cooperate to capture ball 105.

Side wall 122 generally defines inwardly directed annular projection 124 which is generally positioned at or in close proximity to the proximal end of overcap 104. Of note, annular projection 124 may be continuous in design, i.e., may circumferentially extend in an uninterrupted and geometrically consistent manner relative to the inner face of side wall 122. Alternatively, annular projection 124 may be interrupted, such that a plurality of distinct annular projections 124 are defined on the inner surface of side wall 122. Still further, annular projection 124 may be variable in design as it extends circumferentially relative to the inner surface of side wall 122, e.g., the degree to which annular projection 124 extends inwardly relative to side wall 122 may vary from annular region-to-region and/or annular location-to-location.

As shown in FIGS. 1 and 1A, inner cap member 102 includes a plurality of outwardly directed, spaced ridges 126 that define intermediate valley region(s) 128. When flow control device 100 is fully assembled, annular projection 124 is adapted to interact with spaced ridges 126 and valley region(s) 128 to define the position of overcap member 104 relative to inner cap member 102. Thus, in the position depicted in FIG. 1, flow control device 100 is in a "closed" configuration, i.e., the overcap 104 is maintained in flow-restrictive engagement with ball 105. To "open" flow control device 100, a user typically grasps annular rim projection 120 and applies an "upward" force so as to axially translate overcap member 104 relative to inner cap 102. Such axial translation is facilitated by outward deflection of side wall 122 so that annular projection 124 is able to bypass the annular ridge 126 positioned immediately upward thereof. Initially, annular projection 124 falls within the valley region 128 above such annular ridge 126. However, application of additional upward force on annular rim projection 120 will cause further axial travel of overcap element 104 relative to inner cap 102. Ultimately, upward axial travel of overcap member 104 relative to inner cap 102 is prevented by an interior rim stop 130.

When assembling overcap member 104 onto inner cap member 102, annular projection 124 is pressed downward past interior rim stop 130. During such assembly process, side wall 122 of overcap member 104 deflects outwardly sufficient to bypass interior rim stop 130. However, the force applied by a user when repositioning overcap member 104 relative to inner cap member 102 is generally insufficient to overcome the "stop" functionality of interior rim stop 130.

To facilitate movement of annular projection 124 relative to annular ridge(s) 126, one or both of such structures may be radiused. Indeed, in an exemplary embodiment of the present disclosure, annular projection 124 features a radiused geometry so as to facilitate the camming interaction of annular projection 124 relative to annular ridge(s) 126. Comparably radiused geometries for annular ridge(s) 126 further facilitates such camming action. However, in view of the desired "stop" functionality associated with interior rim stop 130, such rim stop structure is generally not radiused.

In use, flow control device 100 is mounted with respect to a bottle 50, either directly or by way of an intermediate adapter 70. Alternatively, flow control device 100 may be premounted with respect to bottle 50, e.g., in a non-detachable manner during fabrication thereof. The user is able to adjust/control flow behavior from bottle 50 by adjusting the relative position of overcap member 104 relative to inner cap member 102. Thus, when the user desires to "open" flow control device 100 to permit fluid flow from bottle 50, he/she typically grasps annular rim projection 120 and pulls upward relative to bottle 50. In the absence of annular rim projection 120, the user is able to grasp overcap member 104 at a convenient location and effect axial translation of overcap member 104 relative to inner cap member 102.

The degree of fluid flow from bottle 50 is generally controlled by the axial travel distance imparted to overcap member 104. Thus, greater flow is permitted by axially translating overcap member 104 to a greater extent, whereas lesser flow is permitted by axially translating overcap member 104 to a lesser extent. Of note, the relative spacing of annular ridge(s) 126 on inner cap member 102 roughly defines the increments of movement available to overcap member 104 (together with the geometric characteristics of annular projection 124, e.g., the width thereof). As annular projection 124 travels past annular ridge 124, the user is likely to feel and/or hear a snapping into place of annular projection 124 enters a valley region 128. To "close" flow control device 100, the user moves overcap member 104 to the position shown in FIG. 1, thereby constricting ball 105 and preventing flow therearound.

Figure 3A:
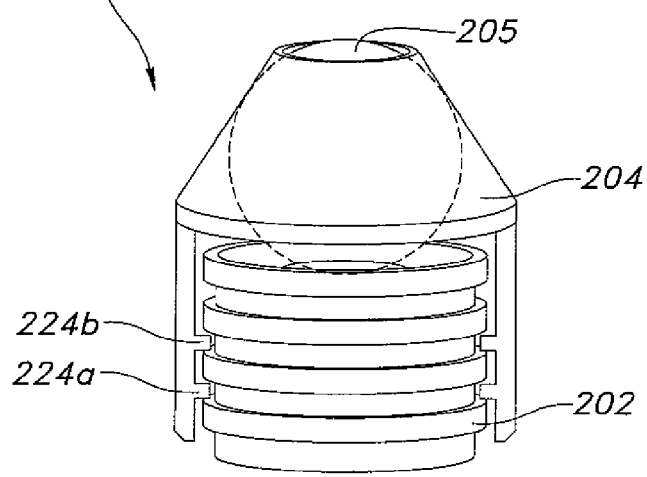
FIGS. 3A and 3B are schematic views of an alternative flow control device according to the present disclosure.
Figure 3B:
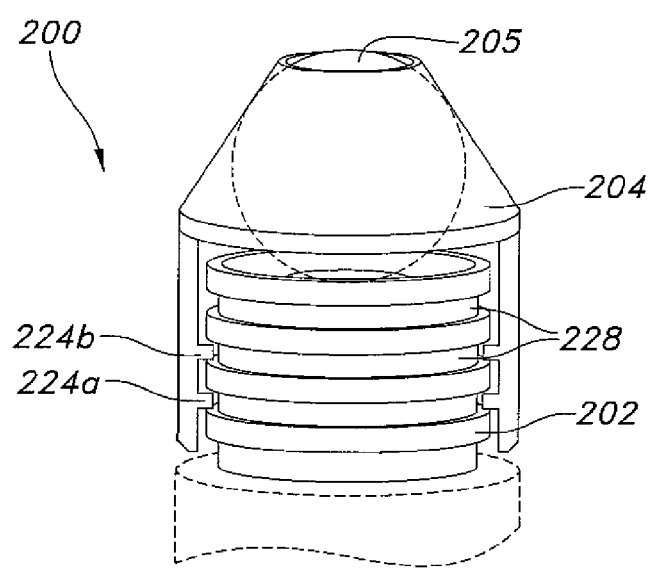

Turning to FIGS. 3A and 3B, an alternative flow control device 200 is schematically depicted. Flow control device 200 includes an inner cap member 202, an overcap member 204 and a ball 205 captured therebetween. Unlike flow control device 100 described herein above, flow control device 200 includes a plurality of spaced annular projections 224a, 224b. Each of annular projections 224; 224b is adapted to engage valley regions 228. The spacing of annular projections 224a, 224b and valley regions 228 is selected so that projections 224; 224b simultaneously align with associated valley regions 228 defined by inner cap member 202. In this way, the stabilizing force associated with interaction between overcap member 204 and inner cap member 202 is increased. Use and operation of flow control device 200 is substantially unchanged as compared to flow control device 100, except that multiple annular projections associated with flow control device 200 enhances the stability and overall strength thereof.

Figure 4:
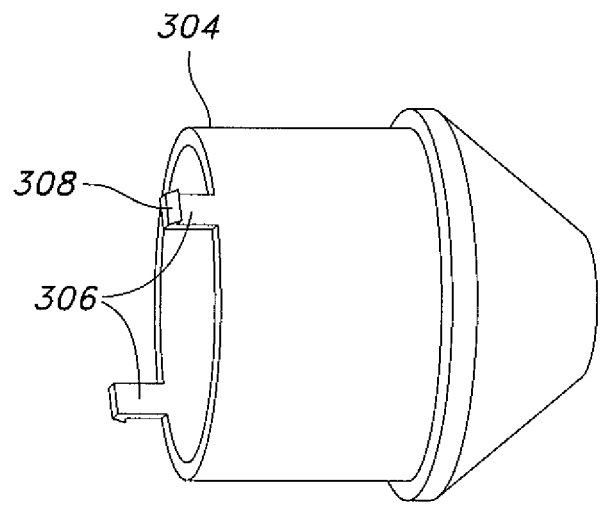
FIG. 4 is a side view of a portion of an exemplary locking mechanism according to the present disclosure.
Figure 5:
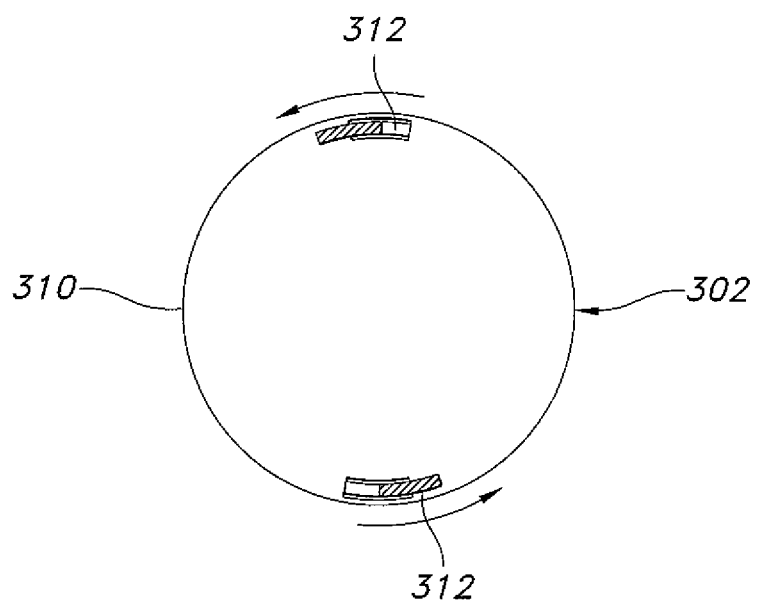
FIG. 5 is a bottom view of a second portion of an exemplary locking mechanism according to the present disclosure.
Figure 6:
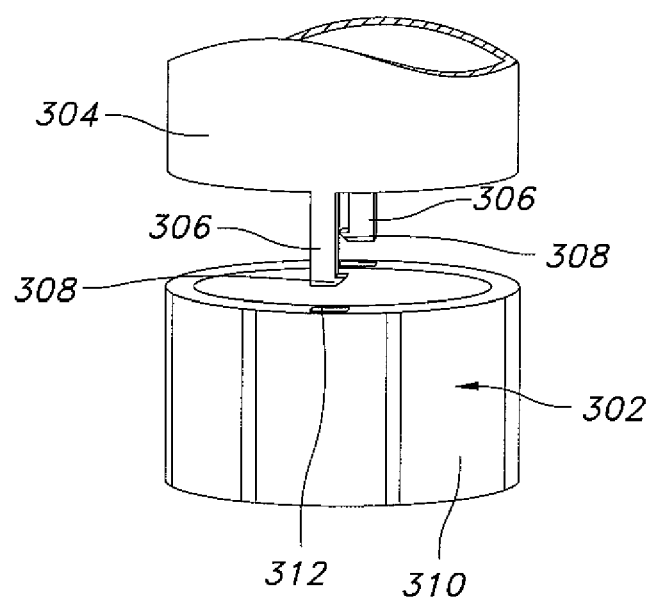
FIG. 6 is an exploded view of structures that cooperate to define a locking mechanism according to the present disclosure.

With reference to FIGS. 4-6, an exemplary locking mechanism 300 for optional inclusion with a flow control mechanism/device of the present disclosure is schematically depicted. As noted above, the optional locking mechanism may take various structural forms. For example, the locking mechanism may include a plurality of downwardly extending legs that extend from the overcap member and that define engagement tabs/flanges adapted to fit within corresponding openings defined in the base element associated with the inner cap member. The tabs may be released by squeezing at appropriate points around the overcap to allow the overcap to be moved and/or the locking effect may be overcome by exerting extra pulling force, thereby deflecting the tabs for release from engagement with the openings. Alternatively, the legs/tabs may be associated with, and extend upwardly from, the base element. In such alternative embodiment, openings/slots may be formed at or near the lower face of the overcap to releasably receive such upwardly extending legs/tabs, thereby reversing the structural arrangement but maintaining the optional locking functionality described herein.

Alternatively, the overcap member may be rotated relative to the inner cap member to place the tabs/flanges in an obstructed/interference position relative to the base element of the inner cap member. Such rotational locking and unlocking of the disclosed legs/tabs is effective whether the legs/tabs extend downwardly from the overcap or upwardly from the base element (for interaction with corresponding openings defined on the opposite structure). Still further, locking tabs may be mounted and/or molded with respect to the inner cap member, such tabs being oriented in a radially outward manner such that the tabs may be adapted to releasably engage openings or depressions formed in the overcap member. Such radial tabs could also engage the annular projection(s) associated with the overcap member. The tabs could be released by squeezing the overcap member at radially offset positions relative to the tab locations. Two tabs may be defined with respect to the inner cap member at a 180° spacing and be released by pressing inward on the overcap member at two opposed locations that are each offset by approximately 90° from respective tab locations. In this way, the overcap member is caused to flex inward at the points of compression, and an associated outward deflection is effected in the areas interacting with the tabs, thereby freeing such tabs from the corresponding openings/slots formed in the outer cap member. Alternatively, the radially extending tabs may be released from engagement with the overcap member by applying an adequate force to the overcap member.

As shown in the exemplary embodiment of FIGS. 4-6, overcap member 304 defines downwardly extending legs 306. Each leg 306 defines an engagement tab/flange 308 at an end thereof. With particular reference to FIGS. 5 and 6, the base 310 of inner cap member 302 defines spaced openings 312 that form a keyed slot for receipt of respective tabs/flanges 308 from overcap member 304. Once aligned and introduced to openings 312, overcap member 304 may be rotated to place tabs/flanges 308 in locking engagement with base 310. So oriented, axial translation of overcap member 304 is not permitted relative to inner cap member unless and until a requisite counter-rotation of overcap member 304 relative to inner cap member 302 is undertaken. As such, locking mechanism 300 functions like a bayonet lock.

The disclosed tabs/flanges 308 may also be used in a non-rotating manner. Thus, for example, tabs/flanges 308 may be adapted to engage associated openings 312 formed in base 310 without rotation therebetween, and may be freed from such engagement by requisite axial force being applied to the overcap member, such force being sufficient to overcome the engagement between the overcap member and the inner cap member. Alternative locking mechanisms may be employed without departing from the spirit or scope of the present disclosure, as will be readily apparent to persons skilled in the art.

Figure 7:
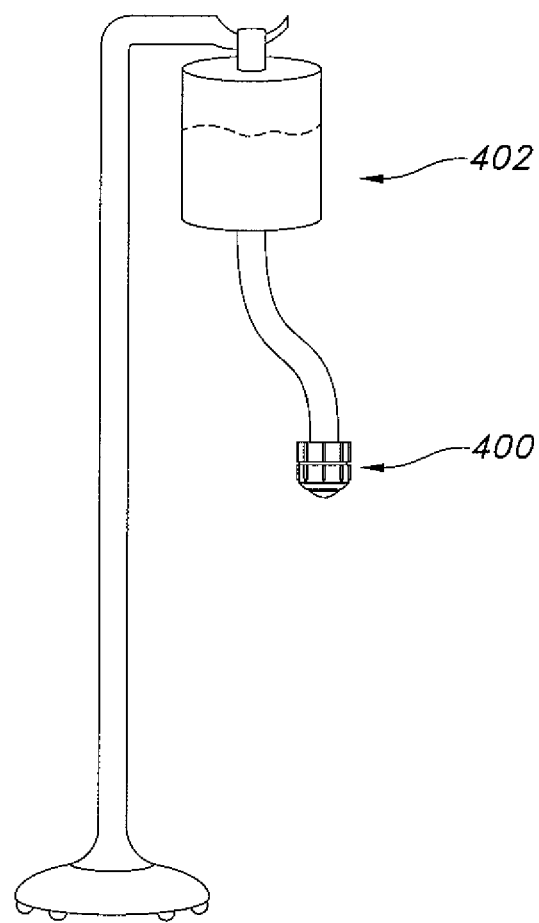
FIGS. 7 and 8 are schematic views of exemplary implementations of the disclosed flow control devices with fluid delivery systems.
Figure 8:
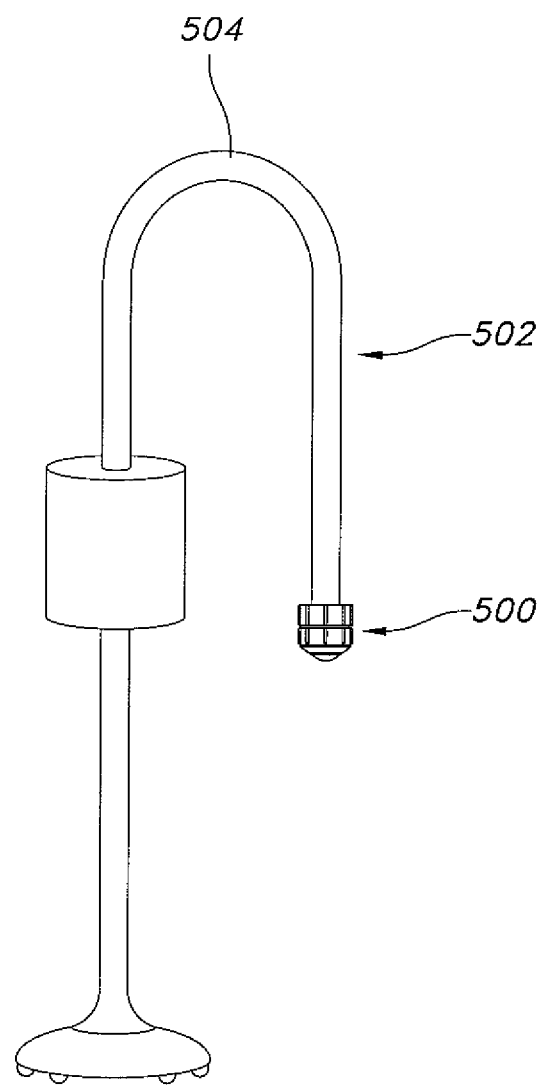

With reference to FIGS. 7 and 8, exemplary implementations of the disclosed flow control mechanisms/devices are provided. Thus, with reference to FIG. 7, a disclosed flow control device 400 is mounted with respect to a fluid delivery apparatus 402 that resembles a conventional intravenous (I.V.) fluid delivery system. However, unlike traditional I.V. systems, the disclosed fluid delivery apparatus 402 is advantageously adapted to deliver a consumable fluid to an individual/animal. Similarly, with reference to FIG. 8, a disclosed flow control device 500 is mounted with respect to a fluid delivery stalk/tube 502 that may be provided to deliver fluid through a flexible or rigid line 504, e.g., based on a pump or available fluid pressure (e.g., water pressure available from a conventional water supply system). The embodiments of FIGS. 7 and 8 may have particular utility in delivering fluids to elderly patients and/or patients with swallowing and/or mouth-related issues. As exemplified by the illustrative embodiments of FIGS. 7 and 8, the flow control mechanisms/devices of the present disclosure are not limited in application to delivering/controlling fluid flow from a vessel/container/bottle or the like. Rather, the disclosed flow control devices have wide ranging applications.

Thus, the present disclosure provides advantageous flow control mechanisms/devices that are easily assembled and easily used. The disclosed flow control mechanisms/devices dispense with the screw threads associated with prior control devices/systems, thereby increasing sealing properties, facilitating one-handed motion, and providing predefined opening/flow levels (e.g., based on the geometry and/or spacing of valley regions as described herein). The disclosed flow control mechanisms/devices permit axial translation between "open" and "closed" configurations, while maintaining structural integrity through the provision of stop(s) at the respective travel ends thereof. Locking mechanisms may be provided to releasably lock the disclosed flow control device in a "closed" configuration until such time as a user desires to release the flow control mechanism/device from such locked orientation. Adapters may be provided to facilitate interaction between the disclosed flow control mechanisms/devices and bottles/containers/vessels of differing designs and/or geometries.

In circumstances where the disclosed flow control mechanism may be used to deliver fluid to a human or other animal, e.g., a dog, cat, rodent, ferret or the like, the material of construction for the ball is advantageously selected to have a specific gravity that is greater than the specific gravity of the fluid to be dispensed therethrough. By employing a material having the foregoing specific gravity, operation of the ball is generally improved because ball does not "float" relative to the fluid and is more susceptible to rotational motion based on forces applied by the animal's tongue.

Turning to FIGS. 9-18, alternative embodiments of the disclosed flow control mechanisms are provided wherein an elongated member is used (at least in part) to regulate fluid flow, rather than a ball, as disclosed in prior implementations. The elongated member may take various structural forms/geometries, but in each case is adapted for axial translation relative to a housing to permit and/or restrict fluid flow. As noted previously, the term "elongated member" expressly encompasses an hemispheric member that controls/facilitates fluid flow in the manner described herein. The scale/magnitude of fluid flow may be increased by providing one or more optional flow channels around and/or through the elongated member, as will be apparent from the exemplary embodiments described herein.

Figure 9:
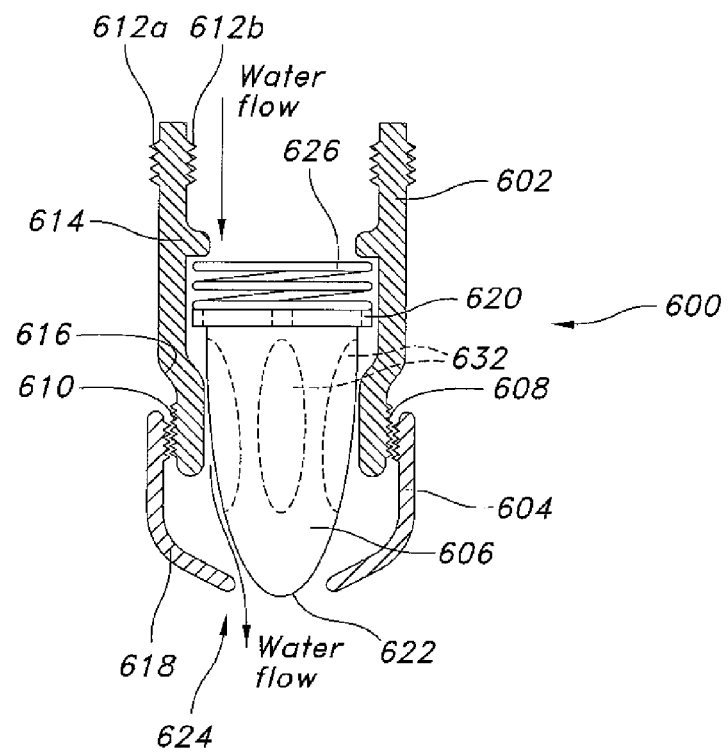
FIG. 9 is a side view, partially in cross-section, of a further exemplary embodiment of a flow control device according to the present disclosure in an "open" configuration.

With initial reference to FIGS. 9-12, a flow control device 600 and component parts thereof are schematically depicted. As shown in FIG. 9 (open position) and FIG. 12 (closed position), flow control device 600 includes a lower cap 602, an upper cap 604 and an elongated member 606. Upper cap 604 defines an inwardly threaded region 608 that is adapted to cooperate with an outwardly threaded region 610 on lower cap 602. Of course, the geometries of the upper and lower caps could be modified such that the upper cap nests within the lower cap—with an associated modification to thread orientations—without departing from the present disclosure. Similarly, threaded regions 608, 610 may be eliminated and the upper and lower caps may instead be adapted for sliding/telescopic travel relative to each other. In embodiments wherein sliding/telescopic travel is permitted, one or more axially spaced ridges and/or detent structures may be provided to facilitate relative positioning of the upper and lower caps at preset locations (see, e.g., comparable structural features in FIGS. 3A and 3B; elements 202, 224*a*, 224*b*, 228). Such spaced ridges/detent structures may be overcome through application of an appropriate force by a user, but otherwise serve to maintain the upper/lower caps in a desired preset location. Thus, the present disclosure expressly encompasses alternative structural implementations wherein an upper cap and a lower cap are adapted for relative travel therebetween, such alternative structural implementations representing minor variations on the structural arrangements/implementations described herein with reference to exemplary embodiments.

Threads 612*a*, 612*b* may be defined at an upper end of lower cap 602 to facilitate mounting with respect to a container/vessel. Alternatively, a flexible member/tube (not pictured) may be employed to join flow control device 600 to a vessel/container, such flexible member/tube generally stretching to accommodate gripping contact with the outer wall of the lower cap 602 and similarly engaging a neck of a vessel/container.

In the exemplary embodiment of FIGS. 9-12, the elongated member 606 is captured between an upper rim 614 and a lower boundary region 616 defined within the lower cap 602. Flow control device 600 is generally moved to an "open position" by rotating upper cap 604 relative to lower cap 602 (as shown in FIG. 9), thereby moving inwardly directed end region 618 of the upper cap 604 distally, i.e., away from the lower cap 602. In alternative embodiments, the upper and lower caps may be repositioned relative to each other by a sliding/telescoping motion. Such movement of the upper cap 604 relative to the lower cap 602 permits axial travel/translation of upper rim 620 of elongated member 606 between upper flange region 614 and lower boundary region 616, thereby permitting fluid flow therearound and/or therethrough.

Figure 12:
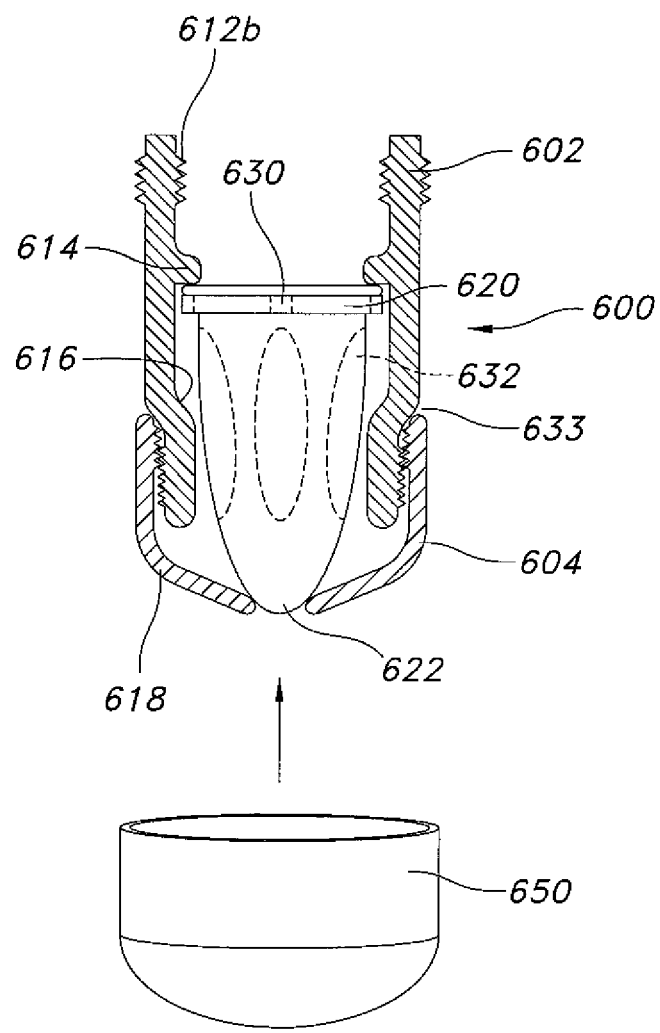
FIG. 12 is a side view, partially in cross-section, of the flow control device of FIG. 9 in a closed orientation, shown with an optional cap member associated therewith.

Conversely, when the lower cap 602 is tightened relative to the upper cap 604, as shown in FIG. 12, axial travel of upper rim 620 is prevented because the inwardly directed region 618 of the upper cap 604 engages conical region 622 of the elongated member 606 and forces upper rim 620 to abut against the upper flange region 614 of the lower cap 602. In addition, further sealing functionality may be provided through sealing interaction between lower cap 602 and upper cap 604 in abutment region 633 (as shown in FIG. 12). Thus, much like the ball in previously described embodiments, when flow control device 600 is in an open position (as schematically depicted in FIG. 9), a pet's tongue may be effective in axially displacing the elongated member 606 toward lower cap 602, thereby creating a flow passage around the elongated member 606 and through the aperture 624 formed in upper cap 604.

In the exemplary embodiment of FIG. 9, a biasing member 626 is positioned between the upper rim 620 of the elongated member 606 and the upper flange region 614 of the lower cap 602. The biasing member 626 may take various forms, e.g., a coil spring, foam-like element, Belleville washer(s) or the like. Regardless of structural form, the optional biasing member 626 is generally adapted to bias the elongated member 606 distally such that, absent a countering force, the conical region 622 of the elongated member 606 is biased into sealing engagement with the inwardly directed end region 618 of the upper cap 604. Users of the disclosed flow control device 600 may override the force of biasing member 626, e.g., by pressing a tongue against the exposed conical region 622 of the elongated member 606.

Sealing of the disclosed flow control device 600 is generally effected so as to limit fluid flow to the desired flow path when in an open position, i.e., through the lower cap 602, around and/or through the elongated member 606, and out the aperture 624 formed in the upper cap 604. Sealing is also generally effective to preclude fluid flow/leakage when the flow control device 600 is in a closed position. Thus, one or more sealing gaskets and/or washers may be incorporated into the disclosed flow control device 600. For example, a sealing gasket/washer may be provided in one or more of the following locations: (i) adjacent the upper rim 620 and the upper flange region 614, (ii) in the region of interaction between the lower cap 602 and the upper cap 604 (including optional sealing in abutment region 633), and/or (iii) in the region of interaction between the conical region 622 and the inwardly directed end region 618. In addition or alternatively, two-shot fabrication of component parts of the disclosed flow control device 600 may be employed at least in part to facilitate sealing interaction therebetween.

Figure 10:
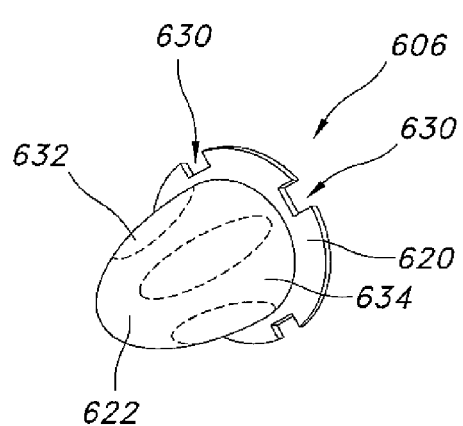
FIG. 10 is a perspective view of an elongated member for use in the exemplary flow control device of FIG. 9.
Figure 11:
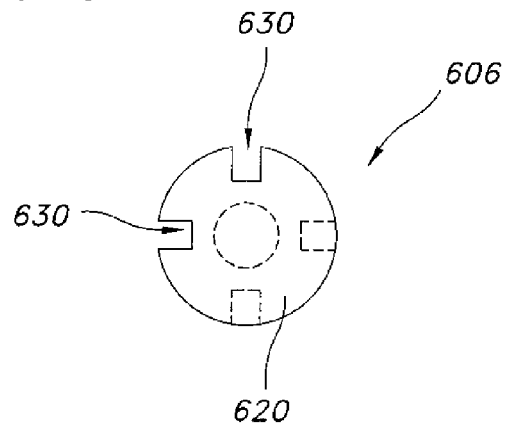
FIG. 11 is a top view of the elongated member of FIG. 10.

Turning to FIGS. 10 and 11, schematic illustrations of an exemplary elongated member 606 are provided. Of note, a plurality of flow channels 630 are defined in upper rim 620 to facilitate fluid flow when the fluid control device 600 is moved to an open position. Thus, in the orientation of FIG. 9, upper rim 620 is spaced from upper flange region 614, thereby permitting fluid to flow through lower cap 602 and through the channels 630 en route to aperture 624. When fluid control device 600 is moved into a closed orientation (as shown in FIG. 12), the channels 630 are obstructed by upper flange region 614 of the lower cap 602 (and potentially an associated gasket/washer), thereby precluding fluid flow therethrough. The number, size and shape of optional channels 630 may be varied, as will be readily apparent to persons skilled in the art. For example, a single channel or 2-6 spaced channels may be formed in upper rim 620, each channel defining a substantially arcuate and/or rectangular geometry.

With further reference to FIG. 10, additional flow channels 632 may be defined on the extension portion 634 of elongated member 606. The additional flow channels 632—when present—further facilitate fluid flow through fluid control device 600. Thus, in the closed position of FIG. 12, flow through additional flow channels 632 is prevented due to sealing between conical region 622 and inwardly directed end region 618. However, when an open position—as exemplified in FIG. 9—is established for flow control device 600, fluid is permitted to flow into the interior of elongated member 606 and then out through additional flow channels 632 en route to aperture 624. The number, size and geometry of additional flow channels 632 may be selected—in combination with other available flow paths related to elongated member 606— to deliver a desired flow rate through flow control device 600, as will be apparent to persons skilled in the art.

With further reference to FIG. 12, an optional cap 650 may be provided for detachable placement relative to flow control device 600. Cap 650 may be adapted to thread onto the distal end of flow control device 600 or may be deflectable/stretchable so as to detachably engage such distal end. In further exemplary embodiments, optional cap 650 may be adapted to "snap on" to flow control device 600. Thus, for example, one or more ridges/detents may be provided on the interior of optional cap 650, the exterior of flow control device 650, or both, to facilitate snapping engagement therebetween. Regardless of the structural interaction between optional cap 650 and flow control device 600, optional cap 650 provides further sealing to flow control device 600, e.g., when not in use, and enhanced sanitary control.

Figure 13:
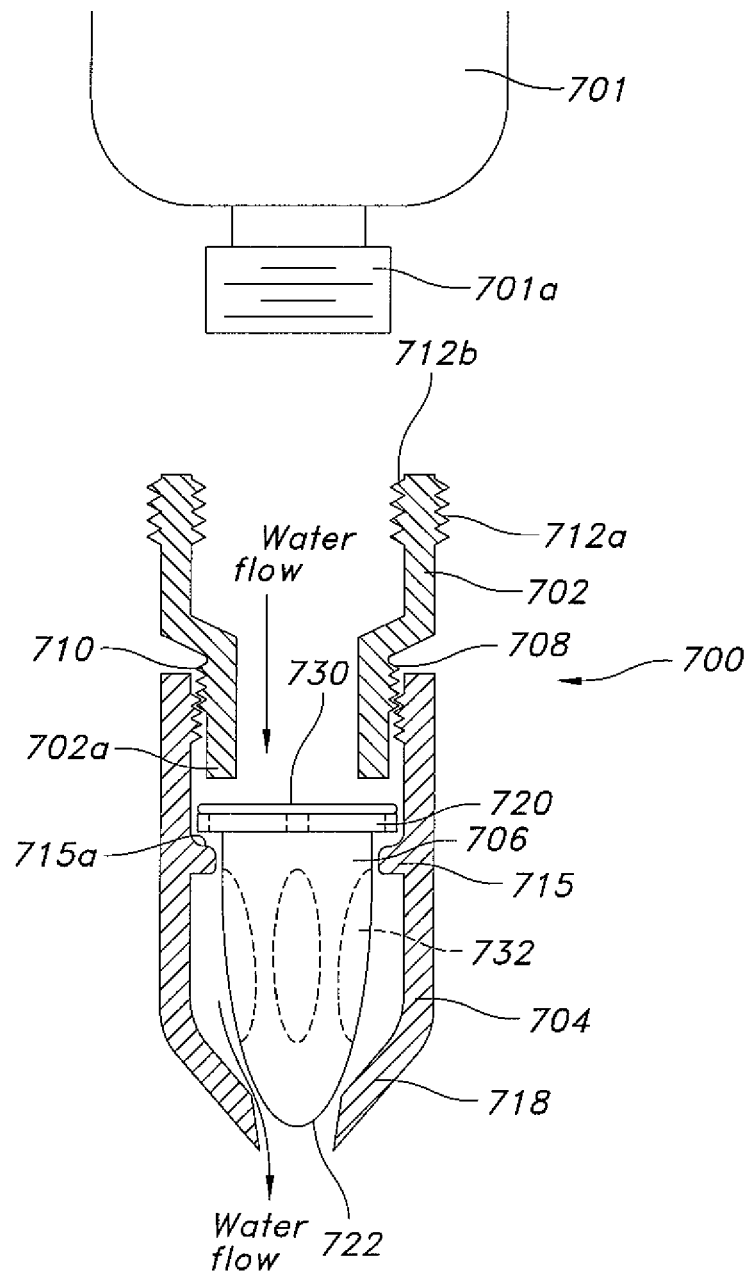
FIGS. 13 and 14 are schematic illustrations of an alternative fluid control device in an open and closed position, respectively.
Figure 14:
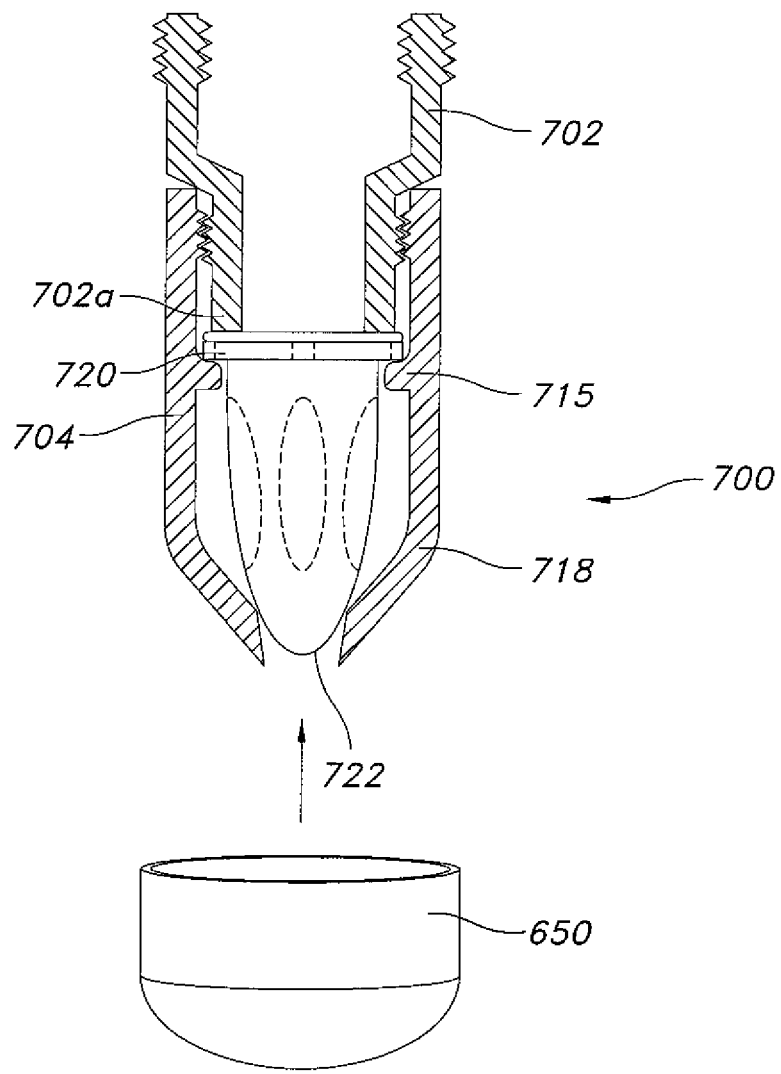

Turning to FIGS. 13 and 14, an alternative fluid control device 700 is schematically depicted. FIG. 13 shows fluid control device 700 in an open position, whereas FIG. 14 shows fluid control device 700 in a closed position. Fluid control device 700 includes a lower cap 702, an upper cap 704 and an elongated member 706 positioned therewithin. The lower cap 702 may define threaded regions 712a and/or 712b for cooperation with a container/vessel. Thus, in the exemplary embodiment of FIG. 13, a bottle 701 defines a threaded neck 701a that is adapted to threadingly engage threaded region 712b on lower cap 702.

Elongated member 706 is captured between abutment face 702a formed on lower cap 702 and flange region 715 defined in the upper cap 704. In the exemplary embodiment of FIGS. 13 and 14, lower cap 702 is threadingly engaged with upper cap 704 through interaction between thread regions 708, 710. Thus, flow control device 700 may be placed in a closed position (as shown in FIG. 14) by tightening lower cap 702 relative to upper cap 704, thereby fixedly securing elongated member 706 against axial travel. In such configuration, the upper rim 720 of elongated member 706 is "pinched" between the lower cap 702 and the upper cap 704. In addition, the conical region 722 of the elongated member is in sealing engagement with inwardly directed end region 718 of upper cap 704. As such, fluid flow through fluid control device is prevented by (i) sealing engagement of upper rim 720 between flange region 715 and abutment face 702a, (ii) sealing engagement of conical region 722 with inwardly directed end region 718, and (iii) one or more optional gaskets/washers (not shown) at interface regions between the operative components described herein. A biasing member, e.g., a spring, may be positioned between upper rim 720 and abutment face 702a to bias the elongated member 706 into sealing engagement with (or at least toward) the inwardly directed end region 718 of upper cap 704.

When in an open configuration (as schematically depicted in FIG. 13), fluid flow is permitted by causing axial movement/translation of elongated member 706 relative to the upper cap 704, e.g., through licking action against the exposed conical region 722 thereof. Fluid flow can occur around upper rim 720, through optional flow channels 730 formed in upper rim 720 and/or through additional optional flow channels 732 formed in the extended portion of elongated member 706. Overall axial travel/translation of elongated member is bounded by the distance between flange region 715 and abutment face 702a. As shown in FIG. 14, an optional cap 750 may be provided to optionally seal the flow control device 700, e.g., when not in use.

Figure 15:
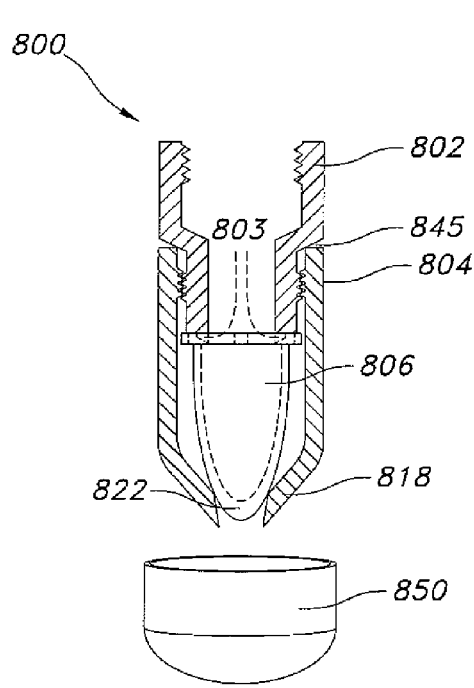
FIGS. 15-17 are schematic illustrations of a further exemplary embodiment of a fluid control device according to the present disclosure.
Figure 16:
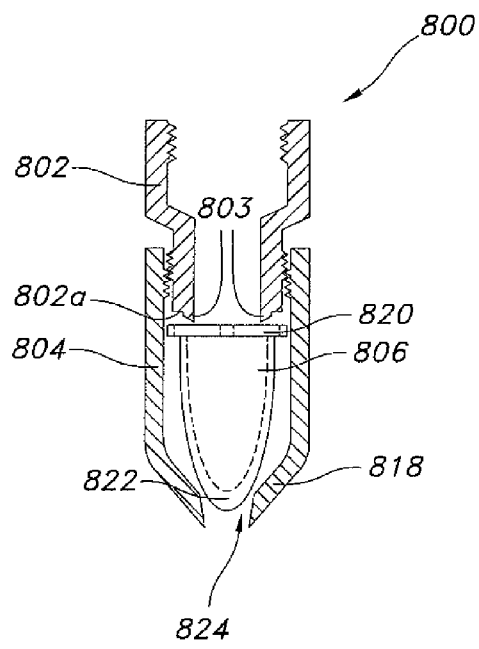
Figure 17:
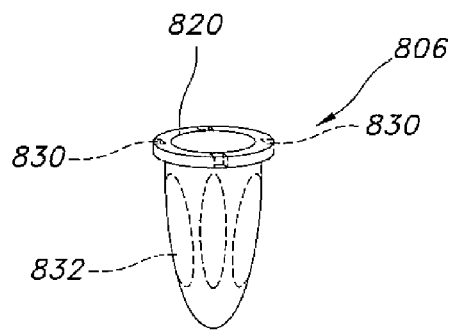

Turning to FIGS. 15-17, a further exemplary fluid control device 800 is schematically depicted which is similar in design and operation to fluid control device 700 described with reference to FIGS. 13-14 herein. Fluid control device 800 includes a lower cap 802, an upper cap 804 and an elongated member 806 positioned/captured therebetween. As shown in FIG. 17, the elongated member 806 defines an upper rim 820 that includes optional flow channels 830 and additional optional flow channels 832 formed in an extended portion thereof. Unlike fluid control device 700 described above, however, the upper cap 804 of flow control device 800 does not define a flange region against which the upper rim 820 of elongated member may be "pinched". Rather, abutment face 802a of lower cap 802 defines a substantially cylindrical inner projection 803 that is configured and dimensioned to engage the inner face of upper rim 820 of elongated member 806.

In use, elongated member 806 is permitted to travel/translate axially relative to the upper cap 804 when fluid control device is an open position (as shown in FIG. 16). In such orientation, fluid flow is permitted around upper rim 820, through flow channels 830 (if present) and through additional flow channels 832 (if present), en route to aperture 824. However, by tightening lower cap 802 relative to upper cap 804, sealing engagement between the conical region 822 of elongated member 806 and the inwardly directed end region 818 of upper cap 804 may be effected. Tightening may be achieved through rotational interaction between lower cap 802 and upper cap 804, or through sliding/telescopic interaction (e.g., with axially spaced regions/detents to define preset relative positionings of the lower and upper caps). The substantially cylindrical inner projection 803 of lower cap 802 provides enhanced sealing between lower cap 802 and elongated member 806. In addition, sealing may be achieved between abutment surfaces in region 845 where lower and upper caps 802, 804 come into contact. Washer(s)/gasket(s) may be provided to further enhance sealing of the disclosed components. In addition, a biasing member (e.g., a biasing spring) may be positioned between the lower cap 802 and the upper rim 820 to enhance sealing functionality of the disclosed device. Still further, an optional cap 850 may be detachably secured to the fluid control device 800, e.g., when not in use, to enhance sealing and/or sanitary conditions.

Figure 18:
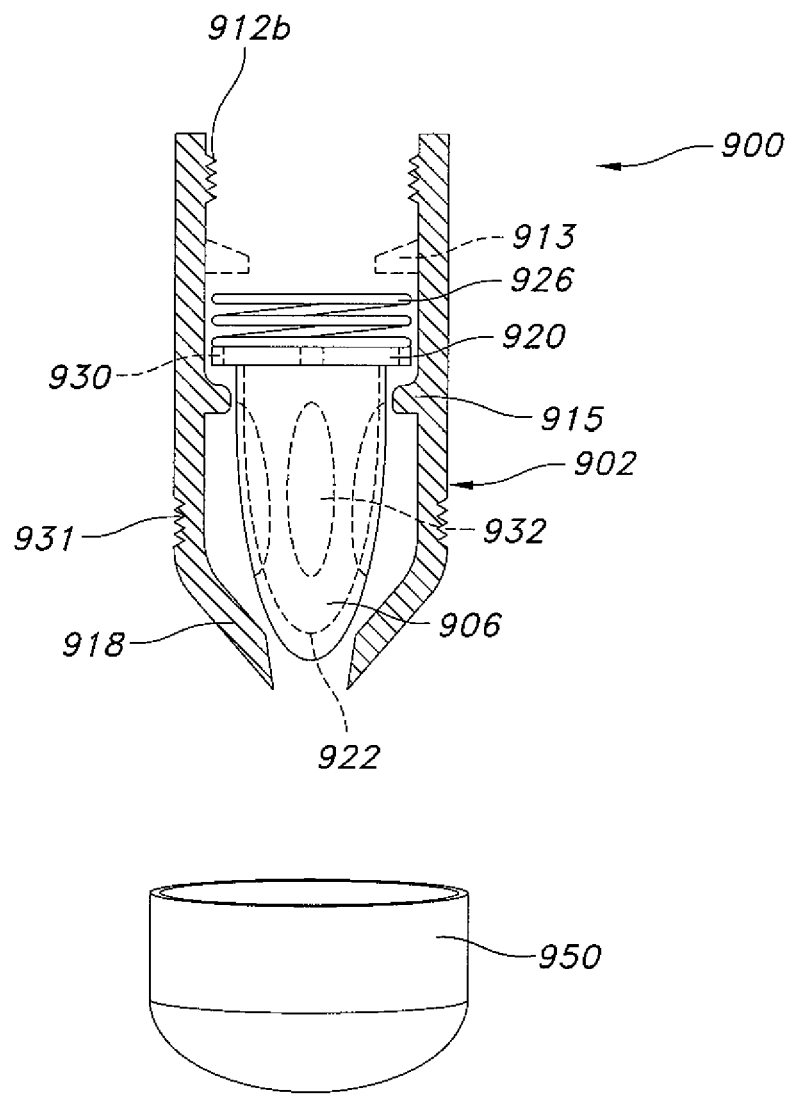
FIG. 18 is a schematic depiction of a further exemplary fluid control device according to the present disclosure.

Turning to FIG. 18, a further exemplary flow control device 900 according to the present disclosure is schematically depicted. However, unlike previous embodiments, a single cap structure 902 is provided in conjunction with elongated member 906. An optional biasing member 926, e.g., a spring, may be positioned in contact with upper rim 920 of elongated member 906. An optional inwardly tapered structure 913 may be defined on an inner wall of the cap structure 902. Such inwardly tapered structure 913 may provide a surface against which the biasing member 926 rests. In the absence of a biasing member 926, the inwardly tapered structure 913 may function to allow unidirectional insertion of elongated member 906 during assembly of fluid control device 900 and to capture the elongated member 906 within cap structure 902, while permitting axial movement/translation thereof.

A flange region 915 is generally defined in cap structure 902 and provides a sealing face for the upper rim 920 of elongated member 906. Of note, elongated member 906 is adapted for sealing engagement between its conical region 922 and the inwardly directed end region 918 of the cap structure 902. A threaded region 931 is generally formed on an outer face of the cap structure 902 for interaction with cap 950. Alternatively, a snap-on connection functionality and/or an elastic engagement functionality (as described above with reference to alternative embodiments hereto) may be employed for detachable connection of cap 950 relative to fluid control device 900. Thus, in use, elongated member 906 is generally free to translate axially relative to the cap structure 902, thereby permitting fluid flow around the upper rim 920, through optional flow channels 930 and/or through optional additional flow channels 932. Flow can be prevented through a sealing force applied by the optional spring 926 against upper rim 920 (thereby forcing upper rim 920 into sealing engagement with flange region 915) and/or by detachably affixing cap 950 to fluid control device 900.

Although flow control mechanisms of the present disclosure, e.g., animal/pet drinking aids, have been described with reference to exemplary embodiments thereof, the present disclosure is not to be limited to the specifics of the disclosed embodiments, but is to be broadly understood. The disclosed embodiments are merely illustrative, and not limitative, of the scope of the present invention, and changes, modifications and/or variations may be utilized without departing from the spirit or scope of the present invention.

The invention claimed is:

1. A flow control device, comprising:
   (a) a lower cap member configured and dimensioned to be mounted with respect to at least one of a fluid container, tube and a stalk;
   (b) an upper cap member defining a flow aperture and movably mounted with respect to said lower cap member; and
   (c) an elongated member positioned between said lower cap member and said upper cap member and adapted for axial motion relative thereto, said elongated member being sized to obstruct fluid passage through said flow passage of said upper cap member;
   wherein a variable flow clearance may be established by axial movement of said elongated member relative to at least one of said lower cap member and said upper cap member.

2. A flow control device according to claim 1, wherein said lower cap member and said upper cap member are telescopically mounted relative to each other.

3. A flow control device according to claim 2, wherein one or more axial positions are established between said lower cap member and said upper cap member by one or more annular ridges or detents.

4. A flow control device according to claim 1, wherein (i) said elongated member defines a conical or hemispheric region; (ii) said upper cap member defines an inwardly directed end region; and (iii) said conical or hemispheric region of said elongated member and said inwardly directed end region of said upper cap member is effective to substantially prevent fluid flow therethough.

5. A flow control device according to claim 1, further comprising one or more sealing gaskets or washers for enhancing sealing functionality between said lower cap member and said upper cap member.

6. A flow control device according to claim 1, further comprising a biasing member in biasing engagement with said elongated member.

7. A flow control device according to claim 6, wherein said biasing member is selected from the group consisting of a spring, a foam element, a Belleville washer, and combinations thereof.

* * * * *